United States Patent
Kaguma et al.

[11] Patent Number: 6,164,358
[45] Date of Patent: Dec. 26, 2000

[54] EQUIPMENT FOR MANUFACTURING LAMINATED METAL SHEET

[75] Inventors: Noriaki Kaguma; Yoshiki Sakamoto; Atsuo Tanaka, all of Yamaguchi-ken, Japan

[73] Assignee: Toyo Kohan Co., Ltd., Tokyo, Japan

[21] Appl. No.: 09/142,371

[22] PCT Filed: Mar. 4, 1997

[86] PCT No.: PCT/JP97/00656

§ 371 Date: Dec. 15, 1998

§ 102(e) Date: Dec. 15, 1998

[87] PCT Pub. No.: WO97/32719

PCT Pub. Date: Sep. 12, 1997

[30] Foreign Application Priority Data

Mar. 4, 1996  [JP]  Japan .................................. 8-70905

[51] Int. Cl.[7] .................................................. B32B 31/00
[52] U.S. Cl. ........................... 156/494; 156/555; 156/582
[58] Field of Search .................................. 156/494, 555, 156/580, 581, 582, 229

[56] References Cited

U.S. PATENT DOCUMENTS

| | | | |
|---|---|---|---|
| 4,610,747 | 9/1986 | Bregenzer | 156/322 |
| 4,778,557 | 10/1988 | Schimer | 156/379.8 |
| 5,071,504 | 12/1991 | Singer | 156/301 |
| 5,198,063 | 3/1993 | Howard et al. | 156/282 |
| 5,283,017 | 2/1994 | Rohleder et al. | 264/25 |
| 5,429,696 | 7/1995 | Rohleder et al. | 156/220 |
| 5,503,705 | 4/1996 | Rohleder et al. | 156/494 |
| 5,679,200 | 10/1997 | Newcomb et al. | 156/308.2 |
| 5,716,472 | 2/1998 | Rossetti | 156/164 |

FOREIGN PATENT DOCUMENTS

| | | |
|---|---|---|
| 51-042787 | 4/1976 | Japan . |
| 57-002100 | 1/1982 | Japan . |
| 4-201237 | 7/1992 | Japan . |
| 5-032372 | 1/1993 | Japan . |

*Primary Examiner*—James Sells
*Attorney, Agent, or Firm*—Brody and Neimark

[57] ABSTRACT

It is an object of the present invention to provide equipment for manufacturing a laminated metal sheet, which eliminates bubbles even in high speed lamination of 200 m/min or more and is excellent in productivity. In the equipment for manufacturing a laminated metal sheet according to the present invention, a metal sheet (1) is laminated with a resin film (3) on one or both side of it by lamination rolls (2), and a support roll (5) is disposed on projected beyond a straight line between the lamination roll (2) and a film roll (6) so as to impart tension to the film (3) when the film (3) is fed to the lamination rolls (2) from the film roll (6). Further, the support roll (5) is provided directly before the lamination roll (2) so as to satisfy the relation of $L \times V \leq 600$ when the lamination speed is V (m/min) and the length of the resin film between the lamination rolls and the support roll is L (m).

8 Claims, 4 Drawing Sheets

EQUIPMENT FOR MANUFACTURING LAMINATED METAL SHEET

FIELD OF THE INVENTION

The present invention relates to equipment for manufacturing a laminated metal sheet, which can effect high speed production of the laminated metal sheet and reduce bubbles generated in high speed lamination.

BACKGROUND OF THE INVENTION

In the field of containers for foods and beverages, laminated metal sheets which are formed by laminating a resin film to a metal sheet have been used in place of the conventional plated steel sheets and coated aluminum sheets. So far, methods for manufacturing these laminated metal sheets have been known (Japanese Patent Laid-open Publication No. Hei-4-201237, for example). They are excellent in the respect that they use no solvent and no ovens for baking finish, differently from the case of manufacturing coated metal cans.

The laminated metal sheets for containers use should satisfy various requirements, for example, good adhesion of a film to a metal sheet endurable to press-forming, deep drawing, ironing, or the like when they are formed into cans and no disfigurement of the surfaces thereof so that the resin film can be free from damages during forming. In this regard, therefore, generation of bubbles in the laminated metal sheet is undesirable because the adhesion between the resin film and the metal sheet is decreased, the surface of the laminated metal sheet is roughened, which easily causes the surface to suffer damages during forming, and further the appearance of the laminated metal sheet is degraded, all due to the bubbles. Therefore, efforts have been made toward preventing the generation of bubbles in the laminated metal sheet when it is manufactured.

Today, as the demand for the laminated metal sheets increases, it is more required to increase lamination speed for the purpose of improving the productivity thereof. However, when the lamination speed is simply increased, a great quantity of bubbles generate, which is the reason why the lamination speed is so far limited.

DISCLOSURE OF THE INVENTION

It is therefore an object of the present invention to solve the problem described above and provide equipment for manufacturing a laminated metal sheet, which eliminates bubbles even in high speed lamination of 200 m/min. or more and is excellent in productivity.

To achieve the above mentioned object, the equipment for manufacturing a laminated metal sheet according to the present invention includes a support roll disposed on a contacting side of a resin film with a lamination roll such that the support roll is projected beyond a straight line between the lamination roll and a film roll so as to impart tension to the film when the film is fed to the lamination rolls from the film roll.

Further, it is also that a support roll is disposed on a contacting side of a resin film with a metal sheet such that the support roll is projected beyond a straight line between a lamination roll and a film roll so as to impart tension to the film.

In addition, it is also that a first support roll for imparting tension to a film is disposed on a contacting side of a resin film with a lamination roll such that the first support roll is projected beyond a straight line between the lamination roll and a film roll and a second support roll is disposed on a contacting side of the resin film with a metal sheet such that the second support roll is projected toward the side reverse to the projecting side of the first support roll. Otherwise, it is also preferable that a first support roll is disposed on the contacting side of the resin film with the metal sheet such that the first support roll is projected beyond the straight line between the lamination roll and the film roll and a second support roll is disposed on the contacting side of the resin film with the lamination roll such that the second support roll is projected toward the side reverse to the projecting side of the first support roll.

Furthermore, the equipment for manufacturing a laminated metal sheet according to the present invention includes a support roll disposed adjacently before the lamination roll such that when the lamination speed is V (m/min.) and the length of the resin film between the lamination roll and the support roll is L (m), the relation L×V≦600 shall be satisfied.

BEST MODE FOR CARRYING OUT THE INVENTION

Figure 1:
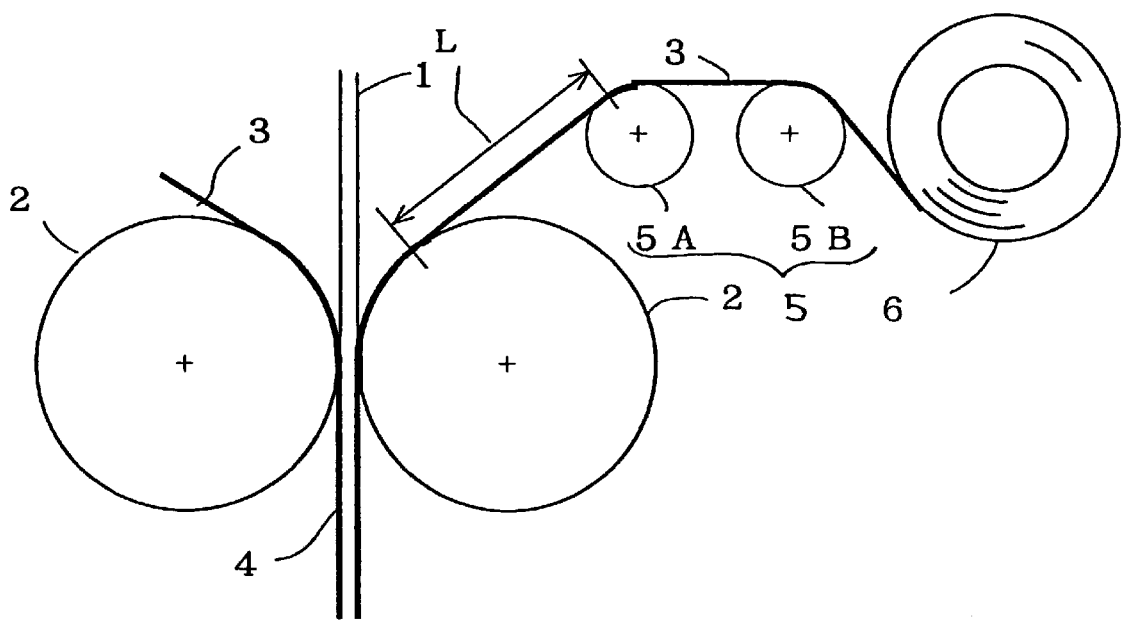
FIG. 1 is a schematic view of an embodiment of equipment for manufacturing a laminated metal sheet according to the present invention.

In the equipment for manufacturing a laminated metal sheet according to the present invention, a heated metal sheet (1) is laminated with a resin film (3) on one or both sides of it by a pair of lamination rolls (2) so as to produce the laminated metal sheet (4). When the resin film (3) is fed to the lamination rolls (2), a support roll (5) is provided for imparting tension to a film. This provision of the support roll (5) makes it possible to eliminate wrinkles from the resin film fed to the lamination rolls (2) even in a high speed lamination and further to eliminate wrinkles from the resin film carried on the lamination rolls (2). The wrinkles in the resin film just before the lamination, which is performed at a high speed, cause bubbles to be much more generated in the laminated metal sheet. Accordingly, if the wrinkles are eliminated, bubbles in the laminated metal sheet (4) can be reduced. The present invention is explained in detail below with reference to FIG. 1.

In FIG. 1, a plated steel sheet such as a chrome-plated steel sheet (tin-free steel) or a tin-plated steel sheet, aluminum sheet or the like is used as the metal sheet (1). In general, the thickness of the metal sheet is 0.1 to 0.3 mm.

As the resin film (3), a single layer or multi-layers mainly composed of a polyester resin (polyethylene terephthalate, polybutylene terephthalate or the like), a polyolefine type resin (polyethylene, polypropylene or the like), a polyamid resin (6, 6-nylon or the like), or a polycarbonate resin or the like is used. An adhesive mainly composed of an epoxy resin may be applied to the above mentioned resin film (3) in advance. The general thickness of the resin film used in a laminated metal sheet for containers use is 5 to 50 μm.

As the lamination roll (2), a rubber-lining roll formed by coating a metal roll with fluororubber, silicone rubber or the like is used.

As the support roll (5), a rubber-lining roll formed by coating a metal roll having the same composition as that used for the lamination roll (2) with fluororubber, silicone rubber or the like, and also a metal roll plated with chromium or the like may be used.

Next, a manufacturing method for the laminated metal sheet is explained in order. First, a metal sheet (1) such as a plated steel sheet or an aluminum sheet is heated to an initial melting point of a resin that is a temperature at which the resin initiates melting, or higher. Normally, it is heated to a temperature higher than the initial melting point mentioned above by 5 to 50° C. so that a melting layer of the resin film can be stably obtained. In the case where the resin film has been in advance coated with the adhesive, the metal sheet is heated to a temperature higher than the temperature at which the adhesive is completely softened. Heating means for this case is, for example, an induction heating device or a resistance heating device.

As explained above, the resin film (3) is fed to one or both sides of the heated metal sheet (1) and press-bonded to the metal sheet by the lamination rolls (2). The resin film and the metal sheet to be used are each in a form of coil and the resin film and the metal sheet are continuously uncoiled, respectively, to be fed to the lamination rolls (2). The thus fed resin film is laminated onto the metal sheet by the pair of lamination rolls (2). The thus laminated metal sheet is then quenched in water or the like.

In the industrially manufacturing equipment for the laminated metal sheet, since the resin film is thinner than the metal sheet, there occur wrinkles in the resin film when the film is guided to the lamination rolls. When the resin film having wrinkles is carried onto the lamination rolls, the wrinkles are set in the resin film because of the rubber surface of the lamination rolls, which has no slidability. If a badly wrinkled resin film is laminated onto a metal sheet, a defective laminated metal sheet, which has the wrinkled resin film laminated thereon, will be manufactured. Such defective laminated metal sheet is commercially of no use. Therefore, in performing lamination, it has been carefully executed to select a film with good configuration and adjust tension imparted to a resin film so that the resin film can be free from the occurrence of large wrinkles. Whereas, not so large wrinkles in the resin film are almost smoothed directly when the resin film is entered between the lamination rolls, and therefore, wrinkles occurring in the resin film before the lamination have been not so much considered as far as the laminated metal sheet has no problem of the resin film about wrinkles. But after detailed investigation, it has been found that if wrinkles occur in a resin film carried on the lamination rolls, a laminated metal sheet with such resin film is liable to involve bubbles and much more bubbles are generated especially in high speed lamination.

Although it is so far only guessed how the wrinkles of the resin film affect the generation of bubbles in the high speed lamination, results obtained from the observation on configurations of the bubbles generated in the laminated metal sheet give the following thoughts. Namely, it is observed that the bubbles of the laminated metal sheet (4) are typically generated much in concaves of the surface of the metal sheet (1) having roughness such as concaves and convexes, and they also typically have longitudinal sizes ranging from 10 $\mu$m to some hundreds $\mu$m along the travelling direction of the metal sheet. It is thought from these typical configurations, the bubbles seem to be generated in a case where at the longest some 10 $\mu$m of a melt-softened resin film cannot smooth the concaves and convexes of the surface of the metal sheet directly after the resin film (2) enters a nip of the lamination rolls. It is thought that in the case where the resin film has wrinkles, the wrinkles will be removed at the time when some $\mu$m of the resin film enters the nip of the lamination rolls, but the resin film does not come into contact enough with the metal sheet until this time. Therefore, it should be rather impossible for the melted resin to smooth the concaves and convexes of the surface of the metal sheet, resulting in easier generation of bubbles.

Next, a practical manner of eliminating the wrinkles of the resin film (3) is explained. In order that the resin film carried on the lamination rolls (2) should be free from wrinkles, the resin film being guided to the lamination rolls has only to be free from wrinkles. Once the resin film without wrinkles is fed upon the lamination rolls, there is no chance to generate wrinkles in the resin film on the lamination rolls. Therefore, it is necessary to eliminate wrinkles from the resin film directly until the resin film comes into contact with the lamination rolls. Among the various investigations, it is found to be effective that a support roll is provided for imparting tension to a film such that the support roll is projected upward beyond a straight line between the lamination roll and the film roll (see FIG. 1). The support roll may be projected downward to the same effect.

It is found to be also effective that a first support roll is provided to project upward or downward beyond the above mentioned straight line and afterwards a second support roll is provided to project downward or upward, that is, toward the reverse projecting side of the first support roll so as to impart tension to a film.

Further, it is found that if lengths of the resin film between the respective support rolls are shortened, the resin film can be free from wrinkles. However, in a case where many support rolls (5A, 5B) are disposed, this is practically unfavorable, taking into consideration spaces for the lamination lines and maintenance of the respective support rolls. Further investigations have lead to the conclusion that when two support rolls (5A, 5B) for carrying a film are disposed and the length L (m) of the resin film between the lamination roll (2) and one support roll (5A) disposed adjacently before the lamination roll is shortened, the resin film can be almost free from wrinkles directly before the lamination rolls. It may be preferable that the length L of the resin film is made as short as possible, if the equipment allows it. Taking into consideration the fact that the quantity of bubbles increases in accordance with increasing speed of lamination V (m/min.), the higher the lamination speed V, the length L of the resin film should be shorter.

Figure 4:
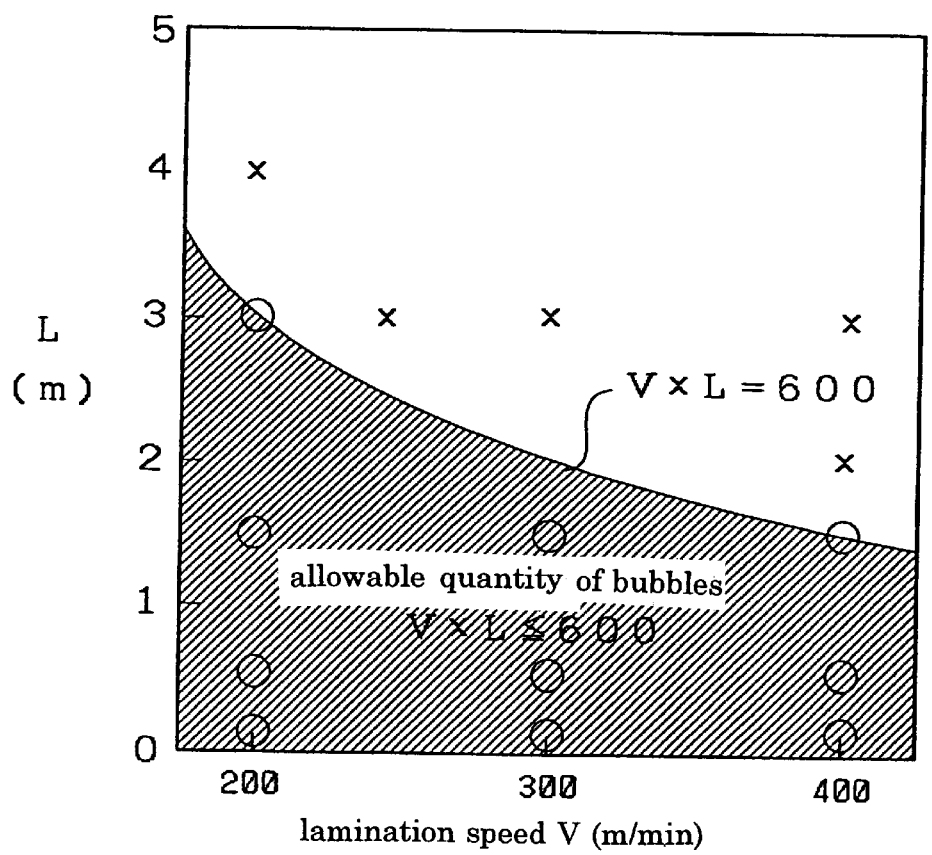
FIG. 4 is a chart showing the relationship between a lamination speed and an area ratio of bubbles.

FIG. 4 shows suitable ranges of the lamination speed V (m/min) and the length L (m) of the resin film between the support roll (5A) and the lamination roll. In FIG. 4, a case of the area ratio of bubbles being 8% or less is represented by a mark of ○ as good (later described for the reason). Another case of the area ratio of bubbles being more than 8% is represented by a mark of × as inferior. The range defined by oblique lines in FIG. 4 is a suitable range for the lamination speed V and the length L of the resin film, that is, a range as expressed by the condition of L×V≦600. When the lamination speed V and the length L of the resin film satisfy the condition of L×V≦600, it is possible to manufacture a laminated metal sheet having an allowable quantity of bubbles.

Figure 2:
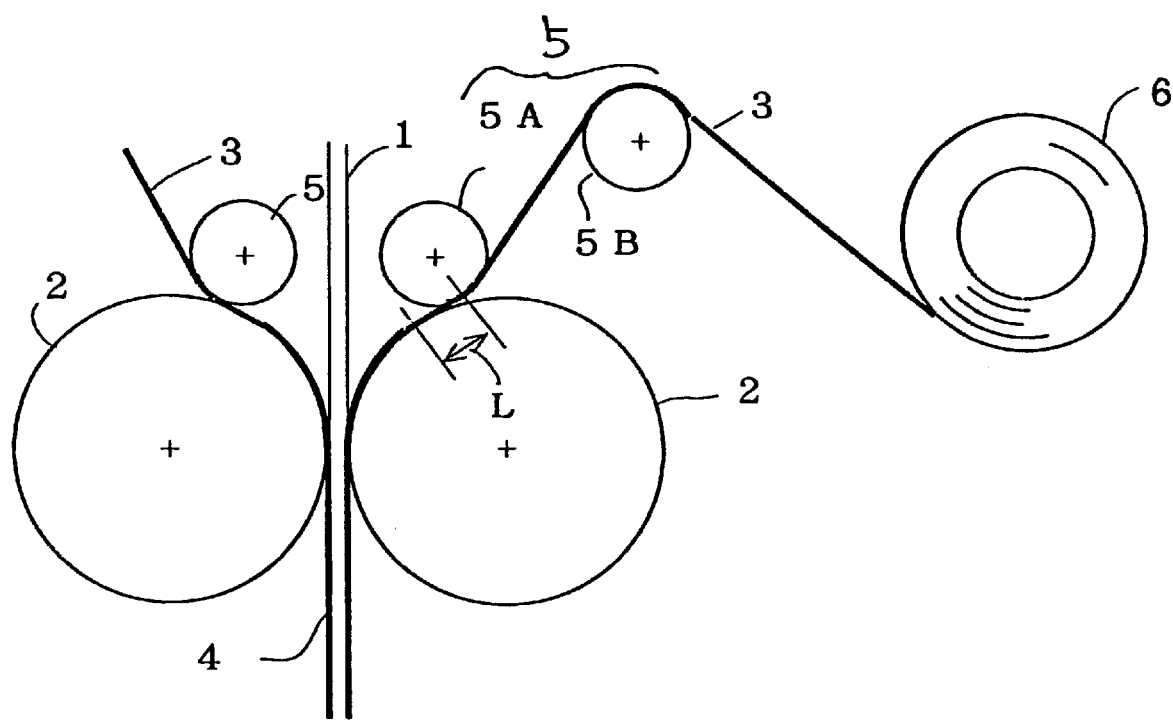
FIG. 2 is a schematic view of another embodiment of the equipment for manufacturing a laminated metal sheet according to the present invention.

The support roll (5A) adjacently before the lamination roll is disposed to come into contact with a side of the resin film to be contacted with the metal sheet as shown in FIG. 2, or it is disposed to come into contact with the side of the resin film to be contacted with the lamination roll as shown in FIG. 1. Either case has substantially the same effect. However, when the resin film is coated with an adhesive, the support roll is disposed to come into contact with the side of the resin film to be contacted with the lamination roll so that the adhesive of the resin film does not stick to the support roll. According to the present invention, two or more support rolls may preferably be disposed along the travelling direction of the film. Because it is required to impart uniform tension to the resin film in the width direction thereof and the two support rolls (5A, 5B) make it possible to impart the widthways uniform tension to the resin film.

As described above, two or more support rolls (5A, 5B) are disposed to guide the resin film (3) to the lamination rolls (2), and the distance between the lamination roll (2) and the support roll (5A) disposed adjacently before the lamination roll is made short, in other words, the length L of the resin film between the lamination roll and the support roll (5A) is shortened, so that the wrinkles mechanically generated in the resin film can be eliminated directly before the lamination rolls. As a result, it is also possible to reduce bubbles generated in the resin film. Further, as far as the length L (m) of the resin film between the lamination roll (2) and the support roll (5A) disposed adjacently before the lamination roll (5A) satisfies the condition of $L \times V \leq 600$ with respect to the lamination speed V (m/min), it is possible to manufacture a laminated metal sheet having a practically negligible quantity of bubbles generated.

Next, examples of the present invention are described below.

EXAMPLE 1 to 3

A chrome-plating steel sheet (TFS, tin-free steel) having a thickness of 0.2 mm and a width of 1000 mm was used as the metal sheet (1). The chrome-plating steel sheet used in this case had a roughness Ra of 0.20 $\mu$m and Rmax 2.2 $\mu$m. As the resin film (3), a film having a single layer of polyethylene-terephthalate having a thickness of 25 $\mu$m and a width of 1000 mm was used. The metal sheet (1) was laminated with the above mentioned resin film on both sides of it. As the lamination rolls (2), silicone-rubber-lining rolls were used. The support rolls (5A, 5B) were disposed as shown in FIG. 1 and metal rolls whose surfaces were plated with chromium were used as the support rolls. The length L of the resin film between the lamination roll (2) and the support roll (5A) disposed adjacently before the lamination roll (2) was 1.5 m. The lamination speed V was 400, 300, or 200 m/min.

EXAMPLE 4 to 6

The length L of the resin film between the lamination roll (2) and the support roll (5A) disposed adjacently before the lamination roll (2) was 0.5 m. The other conditions were same as in Example 1 and the lamination speed was 400, 300, or 200 m/min., respectively.

EXAMPLE 7 to 9

The support roll (5A) disposed adjacently before the lamination roll (2) was arranged so as to come into contact with the resin film (3) on the metal sheet-side and the length L of the resin film was 0.1 m. The other conditions were same as in Example 1 and the lamination speed was 400, 300, or 250 m/min., respectively.

COMPARATIVE EXAMPLE 1 to 3

The support rolls (5A, 5B) were disposed as shown in FIG. 1 and the length of the resin film between the lamination roll and the support roll was 3.0 m. The other conditions were same as in Example 1 and the lamination speed was 400, 300, or 250 m/min., respectively.

COMPARATIVE EXAMPLE 4

Figure 3:
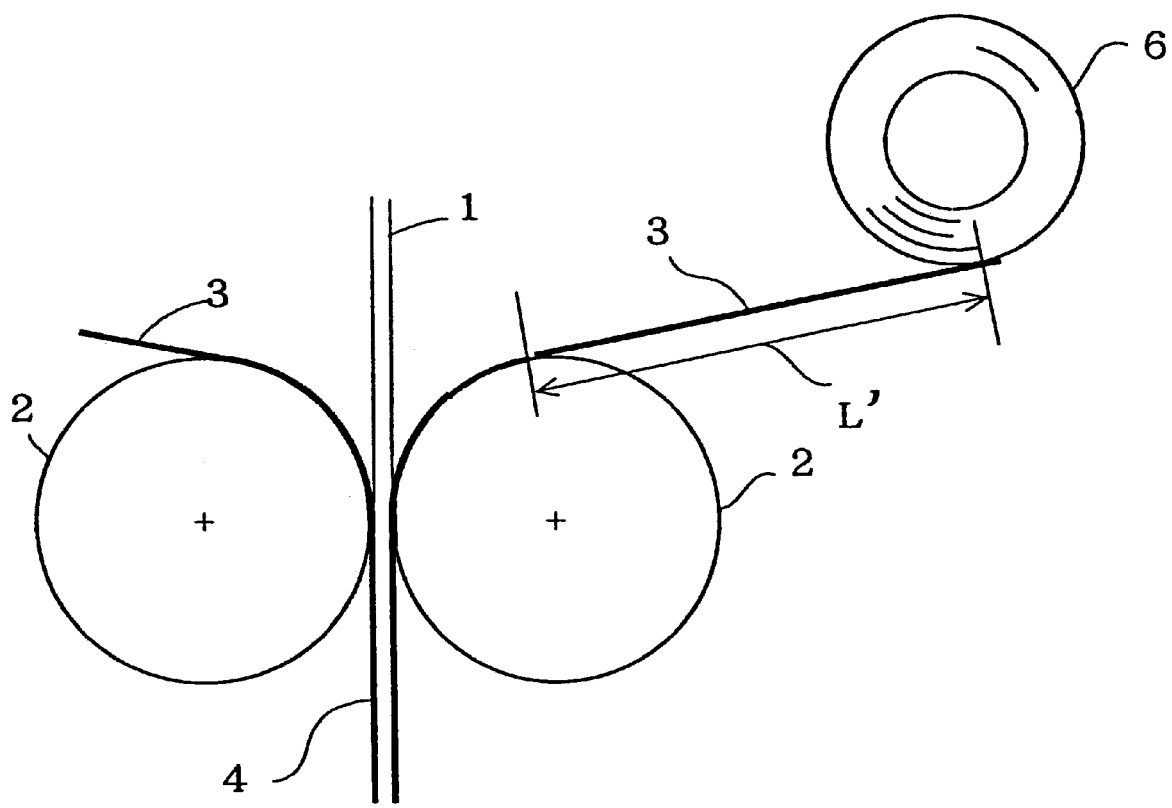
FIG. 3 is a schematic view of a comparative example for manufacturing a laminated steel sheet.

The resin film was directly fed from a coil-formed film roll to the lamination rolls without any support roll used as shown in FIG. 3. In this case, the length L' (m) of the resin film between the lamination roll and the film roll was 1.5 m and the lamination speed was 400 m/min. The other conditions were same as in Example 1.

The laminated metal sheets obtained under the respective conditions mentioned above were observed with regard to the generation degree of bubbles in the laminated metal sheets through a ultrasonic microscope. The area ratio of bubbles was obtained by observing an unit area of 1 mm×1 mm of the laminated metal sheet, determining an area occupied by bubbles, and calculating an area ratio of the bubbles to the unit area.

The allowable area ratio of bubbles of the laminated metal sheet was defined on the basis of a critical range from when the coarse surface of the film resulting from bubbles generated in the laminated metal sheet is chipped off during drawing operation until when the chip-off becomes so remarkable. More specifically, when a laminated metal sheet, which is drawn with a drawing ratio of 2.5, exhibits 8% or less area ratio of bubbles, the film of a can so formed exhibits no remarkable chip-off. Therefore, the critical ratio of bubbles is defined as 8% by area ratio.

Wrinkles occurring in the resin film fed to the lamination rolls at the time of lamination were visually observed.

Next, the results of the respective examples and comparative examples are described. It is found from the results of Example 1 to 3 that the shorter the length L of the resin film between the lamination roll (2) and the support roll (5A) is, the less the wrinkles occur in the resin film guided to the lamination rolls and the lower the area ratio of bubbles becomes as well. In Example 1 to 9, each lamination speed V and each length L of the resin film satisfy the condition of $L \times V \leq 600$, and each resultant area ratio of bubbles is not more than 8%, which has no practical problem. On the contrary, in any of Comparative Example 1 to 3, the condition of $L \times V \leq 600$ is not satisfied, more wrinkles occur in the resin film directly before the lamination rolls, and further, each resultant area ratio of bubbles is higher than 8%, which renders the laminated metal sheet so manufactured practically of no use. Comparative Example 4 is a case where a support roll is not at all used. In this case, so much wrinkles are generated in the resin film fed to the lamination rolls and the resultant area ratio of bubbles of the laminated metal sheet is so high as 25%. Clearly from this result, it is necessary to provide a support roll.

The above mentioned results are summarized in the following table.

POSSIBILITY IN THE INDUSTRIAL USE

According to the equipment for manufacturing a laminated metal sheet of the present invention, wrinkles generated in a resin film fed to lamination rolls can be eliminated and the generation of bubbles in a laminated metal sheet can be suppressed in manufacturing laminated metal sheets for containers use. As a result, it becomes possible to perform high speed manufacturing of the laminated metal sheets.

TABLE 1

|  | Length of Resin film L(m) | Lamination Speed V(m/min) | Relation of V&L V × L (value) | Generation of Wrinkles in film (Visual observation) | Area ration of Bubbles (%) |
|---|---|---|---|---|---|
| Example 1 | 1.5 | 400 | 600 | little | 7 |
| Example 2 | 1.5 | 300 | 450 | little | 5 |
| Example 3 | 1.5 | 200 | 300 | little | 4 |
| Example 4 | 0.5 | 400 | 200 | little | 4 |
| Example 5 | 0.5 | 300 | 150 | little | 3% or less |
| Example 6 | 0.5 | 200 | 100 | little | 3% or less |
| Example 7 | 0.1 | 400 | 40 | no | 3% or less |
| Example 8 | 0.1 | 300 | 30 | no | 3% or less |
| Example 9 | 0.1 | 200 | 20 | no | 3% or less |
| Comparative 1 | 3.0 | 400 | 1200 | much | 15 |
| Comparative 2 | 3.0 | 300 | 900 | much | 11 |
| Comparative 3 | 3.0 | 250 | 750 | much | 9 |
| Comparative 4 | No support roll | 400 | — | too much | 25 |

What is claimed is:

1. Equipment for manufacturing a laminated metal sheet by laminating a resin film onto one side or both sides of a metal sheet by lamination rolls, the equipment including a support roll which is provided on contacting side of the resin film with the lamination roll such that the support roll is projected beyond a straight line between the lamination roll and a film roll so as to impart tension to a film when the film is fed to the lamination rolls from the film roll, and further provided directly before the lamination roll so as to satisfy the relation of $L \times V \leq 600$ when the lamination speed is V (m/min) and the length of the resin film between the lamination roll and the support roll is L (m).

2. Equipment for manufacturing a laminated metal sheet by laminating a resin film onto one side or both sides of a metal sheet by lamination rolls, the equipment including a support roll which is provided on a contacting side of the resin film with the metal sheet such that the support roll is projected beyond a straight line between the lamination roll and a film roll so as to impart tension to a film when the film is fed to the lamination rolls from the film roll, and further provided directly before the lamination roll so as to satisfy the relation of $L \times V \leq 600$ when the lamination speed is V (m/min) and the length of the resin film between the lamination roll and the support roll is L (m).

3. Equipment for manufacturing a laminated metal sheet by laminating a resin film onto one side or both sides of a metal sheet by lamination rolls, the equipment including support rolls, wherein a first support roll is provided on a contacting side of the resin film with the lamination roll such that the first support roll is projected beyond a straight line between the lamination roll and a film roll so as to impart tension to a film when the film is fed to the lamination rolls from the film roll and afterwards a second support roll is provided on the other contacting side of the resin film with the metal sheet such that the second support roll is projected reversely to the projecting side of the first support roll, and further provided directly before the lamination roll so as to satisfy the relation of $L \times V \leq 600$ when the lamination speed is V (m/min) and the length of the resin film between the lamination roll and the support roll is L (m).

4. Equipment for manufacturing a laminated metal sheet by laminating a resin film onto one side or both sides of a metal sheet by lamination rolls, the equipment including support rolls, wherein a first support roll is provided on a contacting side of the resin film with the metal sheet such that the first support roll is projected beyond a straight line between the lamination roll and a film roll so as to impart tension to a film when the film is fed to the lamination roll from the film roll and afterwards a second support roll is provided on the other contacting side of the resin film with the lamination roll such that the second support roll is projected reversely to the projecting side of the first support roll, and further provided directly before the lamination roll so as to satisfy the relation of $L \times V \leq 600$ when the lamination speed is V (m/min) and the length of the resin film between the lamination roll and the support roll is L (m).

5. The equipment for manufacturing a laminated metal sheet according to claim 1, wherein the lamination speed is 200 m/min. or more.

6. The equipment for manufacturing a laminated metal sheet according to claim 2, wherein the lamination speed is 200 m/min. or more.

7. The equipment for manufacturing a laminated metal sheet according to claim 3, wherein the lamination speed is 200 m/min. or more.

8. The equipment for manufacturing a laminated metal sheet according to claim 4, wherein the lamination speed is 200 m/min. or more.

* * * * *